United States Patent [19]

Ferretti

[11] 4,376,833
[45] Mar. 15, 1983

[54] COMPOSITION FOR PRODUCING SELF-SUPPORTING STIFF EXPANDED MATERIALS

[75] Inventor: Romeo Ferretti, Forli, Italy
[73] Assignee: Pro-Sac, S.p.A., Italy
[21] Appl. No.: 213,270
[22] Filed: Dec. 5, 1980

Related U.S. Application Data

[63] Continuation-in-part of Ser. No. 60,699, Jul. 25, 1979, abandoned.

[51] Int. Cl.$^3$ .............................................. C08J 9/00
[52] U.S. Cl. ................................... 521/122; 521/107; 521/108; 521/137; 521/138; 521/906; 521/907
[58] Field of Search ............................. 521/122, 906

[56] References Cited

U.S. PATENT DOCUMENTS

| | | | |
|---|---|---|---|
| 3,201,372 | 8/1965 | Wagner | 521/906 |
| 3,227,666 | 1/1966 | Showalter | 521/122 |
| 3,455,850 | 7/1969 | Saunders | 521/122 |
| 3,625,872 | 12/1971 | Ashida | 521/122 |
| 4,011,195 | 3/1977 | Self | 521/122 |
| 4,043,950 | 8/1977 | Wilmsen | 521/122 |
| 4,051,081 | 9/1977 | Jabs et al. | 521/122 |
| 4,057,519 | 11/1977 | Summers et al. | 521/122 |
| 4,083,818 | 4/1978 | Brackenridge | 521/906 |
| 4,190,696 | 2/1980 | Hort | 521/906 |
| 4,216,294 | 8/1980 | Halle et al. | 521/122 |

*Primary Examiner*—Morton Foelak
*Attorney, Agent, or Firm*—Pollock, Vande Sande and Priddy

[57] ABSTRACT

The invention relates to a composition for the production of stiff and self-supporting expanded materials, the composition being based on an unsaturated polyester resin, an isocyanate and a filler, preferably an inert silicate material, with or without other fillers such as cork and ash, said composition having improved expandibility features and being especially useful for the production of stiff, expanded, and noncrumbling materials. These materials are especially useful for self-supporting structures such as doors and wall partitions.

18 Claims, No Drawings

COMPOSITION FOR PRODUCING SELF-SUPPORTING STIFF EXPANDED MATERIALS

CROSS-REFERENCE TO RELATED APPLICATION

This application is a continuation-in-part of co-pending application Ser. No. 60,699 filed July 25, 1979, now abandoned.

BACKGROUND OF THE INVENTION

This invention relates to a composition for the production of expanded materials which are stiff and self-supporting. More particularly, this invention relates to a composition based on an unsaturated polyester resin, an isocyanate, and a filler material. Unsaturated polyester resins have been used in the prior art in the manufacture of products such as building sheets, automobile fenders, boats, and the like, and have been used together with aqueous metal silicates, such as sodium silicate, for the production of laminated products containing reinforcing fibers or a core of expanded metal lath (see U.S. Pat. No. 4,011,195).

Plastic materials have been formed from compositions containing hydroxyl-terminated linear polyesters, an isocyanate, an aqueous alkali metal silicate and fillers (see U.S. Pat. Nos. 4,042,536; 4,097,422; 4,142,030; 4,057,519). These plastic materials contain aqueous alkali metal silicates, preferably sodium or potassium silicate, which chemically react with other components, and are used for products which may have a low strength compared to their specific density. The plastic materials obtained by such compositions are generally used as insulating panels or foams for coating buildings owing to their good fire and heat resistance.

As it is well-known from the prior art in the matter of expanded materials, the synthetic compositions often used as basic materials are characterized by the presence of isocyanates associated with polyols, and such materials can be expanded up to 10 times their original volume. The expanded materials thus obtained with a density of not more than 100 kg/m$^2$ have a mechanical strength which is inadequate for a technically satisfactory use as structural materials and they do not have physical properties conducive to the production from them of articles of a large size and having self-supporting properties. On the contrary, there are obtained, as a rule, expanded products of a small size, which tend to crumble and do not hold screws, so that they are virtually incapable of withstanding ordinary mechanical stresses.

It is to be noted, in particular, that the defect of brittleness, in addition to restricting the field of application of the expanded materials to that of sound-absorbing and/or self-extinguishing fillers, requires the use of expensive metal supporting members such as zinc or aluminum to ensure adequate supporting strength. This has undesirable results during the manufacturing operations including an increase in scrap produced.

SUMMARY OF THE INVENTION

It is thus an object of the present invention to provide a composition, based on an unsaturated polyester resin, which does away with the above-indicated shortcomings, or at least reduces them to a neglectable degree, while affording special advantages.

It is another object of this invention to provide a composition based on an unsaturated polyester resin capable of forming a cellular, expanded material which combines thermal and acoustic insulation with considerable stiffness and mechanical strength. It is still another object of this invention to provide a composition capable of use in casting relatively large cellular bodies.

It is yet another object to provide a composition having electrical insulation properties and which resists weathering, and attack by acids and brine of marine origin.

In accordance with this invention there is provided a composition consisting essentially of:

an unsaturated polyester resin in the amount of 28 to 46 percent by weight;

an isocyanate in the amount of 12 to 28 percent by weight;

an inert anhydrous filler in the amount of 12 to 40 percent;

a catalyst in the amount of about 0.5 to about 2.5 percent by weight;

a self-extinguishing compound in the amount of about 3.5 to about 11 percent by weight; and styrene in the amount of 0 to about 6 percent by weight.

Optionally the composition may contain as other constituents polyols, soybean oils, hydrogen peroxide, and an accelerator, alone or in combination with each other. The polyol, which may be present in the amount up to 18 percent, preferably about 3 to about 9 percent by weight, serves as a priming agent for the expansion reaction rather than as a basic constituent of the expanded material, and is most preferably present in a low concentration, e.g., about 3 to about 4 percent by weight. The glycerols such as 1, 2, 3-propanetriol and the sugar alcohols are typically useful polyols. Polyol is intended to include the resinous polymaleate compounds commercially available, such as for example that sold under the trademark CARADOL 30 by Shell Co.

The soybean oil which may be present in an amount up to about 3.5 percent, is an epoxidized oil, and serves to increase the shock-resistance of the product.

Hydrogen peroxide, which may be present in an amount up to 2.0 percent accelerates the expansion of the composition.

The accelerator, which may be present in an amount up to about 0.3 percent increases the rate of reaction of the catalyst, and is selected to be compatible with the catalyst.

The resulting composition according to the invention produces, quite surprisingly, an expanded material which provides a useful combination of the usual properties of thermal and acoustic insulation with a considerable stiffness and mechanical strength, which was quite unpredictable on the basis of the cellular structure of such a product.

Among the several advantages afforded by the stiff expanded material as obtained by virtue of the composition according to this invention, there can be mentioned the possibility of obtaining, by casting, articles of very large size, such as laminates of the size of 300 by 120 by 5 cm weighing approximately 120 kg, and slabs having a thickness of from 2 to 15 cm, all such articles being capable of receiving external coatings of a number of materials (wood, asbestos-cement, plastics, laminates, aluminum and many others) and more particularly coatings of marble grit and polyester resin on a substrate of glass fibers.

Other advantages are the resistance to weathering agents, acids, brine of marine origin, and the electric insulation properties. The combination of such properties provides the possibility of using the stiff, expanded materials obtained according to this invention with surprisingly outstanding results in many different fields, such as:

(a) components of self-supporting panels for partition walls, wall coverings, ceilings and false-ceilings and the like in the building industry;

(b) supporting structures for veneers and plastic laminates in the furniture industry;

(c) self-supporting insulating layers in the refrigeration industry; and (d) dielectrics in the electrical, electronic, telephonic and like industries.

Their possible applications in the railway signal manufacture and in maritime and harbor installations are also important.

The present invention is based on (a) an unsaturated polyester resin, (b) an isocyanate, (c) an inert filler, (d) a catalyst, (e) a self-extinguishing compound, and (f) styrene.

The unsaturated resin component is added as solution a, and according to the present invention the term "unsaturated polyester resin" refers to a solution of a linear polyester in a vinylic monomer, preferably styrene. The vinylic monomer is preferably present in the amount of about 25 to about 50 percent by weight.

The unsaturated polyester resin used in accordance with this invention is of the type disclosed in U.S. Pat. No. 4,011,195, and may be obtained by polycondensation of one or more diols with one or more, and usually two, dicarboxylic acids, at least one of which is unsaturated. Typically useful diols are ethylene glycol, propylene glycol, butylene glycol, diethylene glycol, dipropylene glycol, polyethylene glycol and polypropylene glycol. Typically useful dicarboxylic acids are maleic acid, maleic anhydride, phthalic acid, phthalic anhydride, fumaric acid, adipic acid and succinic acid.

The unsaturated polyester resin is preferably an orthophthalic polyester resin and a typically useful resin composition is produced by a diol in the amount of about 32 to about 38 percent by weight, maleic anhydride in the amount of about 15 to about 20 percent by weight, phthalic anhydride in the amount of about 23 to about 25 percent by weight, and styrene as a solvent in the amount of 25 to 35 percent by weight. Especially useful in this invention is an unsaturated orthophthalic polyester consisting of propylene glycol, phthalic anhydride, and maleic anhydride in a mol ratio of 1 to 0.5 to 0.5 respectively.

The following Table illustrates typical resin compositions which may be used in accordance with this invention.

TABLE

| Components | (Parts in mols) Resin | | | | | | |
| --- | --- | --- | --- | --- | --- | --- | --- |
| | A1 | A2 | A3 | A4 | A5 | A6 | A7 |
| Fumaric acid | — | — | 0.5 | — | 0.4 | 0.5 | — |
| Isophthalic acid | — | — | 0.5 | — | — | 0.5 | — |
| Phthalic anhydride | 0.5 | 0.5 | — | 0.6 | 0.4 | — | 0.6 |
| Adipic acid | — | — | — | — | 0.2 | — | — |
| Maleic anhydride | 0.5 | 0.5 | — | 0.4 | — | — | 0.4 |
| Propylene glycol | 0.7 | | | | | | |
| | 0.5 | | | | | | |
| | 0.5 | | | | | | |
| Diethylene glycol | — | 0.3 | — | — | — | — | — |
| Neopentyl glycol | — | — | — | 0.5 | — | — | — |
| Dipropylene glycol | — | — | — | — | — | 0.5 | — |

The polyester resin and styrene are mixed in amounts of 55–70 parts resin to 45–30 parts styrene after having added a suitable inhibitor, usually hydroquinone.

The isocyanate may be any of the diisocyanates useful in the production of polyurethane foams, and is preferably one of the commercially available isocyanates as exemplified by tolylene-2-4-diisocyanate, tolylene-2-6-diisocyanate, polyphenyl-polymethylene-isocyanate, 4, 4' diphenylmethane diisocyanate, and 1, 5 naphthalene diisocyanate. Other useful isocyanates are disclosed in U.S. Pat. Nos. 3,981,831 and 4,042,536. Especially preferred is methylene-diphenyl diisocyanate sold under the tradenames CARADATE (Shell Co.) and TEDIMONTI 31 (Monteconti of Italy).

The filler is an inert, high temperature particulate material such as anhydrous silicates, obsidian, vitreous trachyte, pearlite, ground fire clay, kaolin, ceramics, glass or quartz hollow spheres such as are sold under the trademark SFERULINE. The preferred filler is an inert anhydrous silicate.

The term "inert anhydrous silicate" refers to silicates which are non-aqueous and chemically inert with respect to other components in the composition. The preferred silicates are the alumina silicates as exemplified by phyllites, a typical composition for which is:
silica ($SiO_2$): 61%
alumina ($Al_2O_3$): 30%
alkali ($Na_2O$): 5%
ferric oxide ($Fe_2O_3$): 4%
The physical properties of this inert silicate are:
bulk density: 2.85 gram/cm3
diameter (microns): 300
melting point °C.: 1200
hardness (Mohs): 5
The particle size of the inert filler is preferably in the size range of 100 to 400 microns and has a melting point higher than about 1000° C.

Other fillers such as expanded polystyrene beads, cork, and ash may optionally be used with the above-mentioned fillers.

The fillers may be present in the amount of from about 12 to about 40 percent by weight, and in the preferred composition from about 24 to about 35 percent by weight.

The catalyst may be any of the peroxides well-known in processes for hardening polyester resins, and the preferred catalysts are the peroxides of the ketones. Typically useful catalysts are benzoyl peroxide, cyclohexonone peroxide, and methyl ethyl ketone peroxide. The concentration of catalyst may suitably range from about 0.5 to 2.5 percent by weight of the composition. If an accelerator is used with the catalyst the accelerator selected will be based upon the catalyst used, and the combination may be any of the pairs usually used in hardening polyester resins. Typically useful combinations are benzoyl peroxide and dimethylaniline; cyclohexanone peroxide and cobalt nathphenate; and methyl ethyl ketone peroxide and cobalt octoate.

The self-extinguishing compound refers to flame-retardant compounds and the preferred compounds are the chlorophosphoric compounds. The preferred compounds are the resins having the general formula:

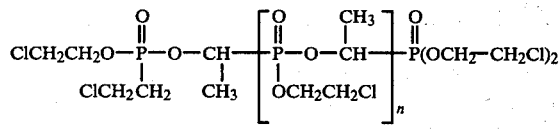

known in the trade as PHOSGARD-C-22R which is typically employed with the polyester resins in a percentage up to 15%; however, in the case of the composition according to this invention a percentage as low as about 3.5 percent by weight of such self-extinguishing material is sufficient.

As regards the production technology of the expanded materials according to the invention the hardening of the resin in the presence of the catalyst-accelerator may take place at a constant temperature of 22° C.±1° C. and at a relative humidity of 55 to 60 hygrometric degrees. For industrial requirements, the polymerization of the expanded material can be accelerated by using ovens with a controlled temperature up to 70° C. The pressures exerted by the expanded material during expansion vary, according to the percentages of the compounding ingredients, from 60 kg/m² to 200 kg/m².

By varying the percentages of the compounding ingredients, there can be obtained apparent specific gravities variable from 180 to 300 kg/m³. The increase of the specific gravity involves an improvement of the mechanical strength so that the end product is a stiff, compact and well cross-linked expanded material having a closed-cell structure and physical properties definitely improved over those of the materials of this kind previously produced.

The stiff expanded material thus obtained can be machined with the tools which are conventional in the processing of wood.

The cold reaction of the compound takes place according to the following stages:
liquidity stage: 13 seconds
expansion time: 71 seconds
condensation: 85 seconds The weight drop from the liquid state to the solid state is in the order of about 8%.

Tests of the product as to flame resistance give the following results:

when the product is subjected to penetration by the flame the high phosphorus content delays the penetration of the heat;

when the material is subjected to a test for flame propagation the high content of chlorine extinguishes the flame; and no toxic gas or black smoke are produced.

Having described the invention the following Examples are offered to illustrate it in more detail.

EXAMPLE I

Into a mixer there are contemporaneously introduced from suitable dosage hoppers:

| | | |
|---|---|---|
| 7.400 kg | (37.0%) | of orthophthalic polyester resin (A1 of Table diluted with styrene in a ratio of 65:35). |
| 3.800 kg | (19.0%) | of isocyanate (CARDATE) |
| 6.940 kg | (34.7%) | of inert anhydrous silicate powder (PHYLLITE) |
| 0.960 kg | (4.8%) | of self-extinguishing compound (PHOSGARD) |
| 0.140 kg | (0.7#) | of catalyst (methyl-ethyl-ketone peroxide) |
| 0.760 kg | (3.8%) | of styrene |
| 20.000 kg | (100%) | |

The components are mixed for 13 seconds, and the composition is poured into a die having a cavity of 100×100×8 cm and compressed at a pressure of 100 kg/cm² for 60 seconds. The resulting panel has a gross density of 230 kg/m³, a compression strength of 54 kg/cm² and a K-factor of 0.024.

EXAMPLE II

Into a mixer there are contemporaneously introduced from suitable dosage hoppers:

| | | |
|---|---|---|
| 8.664 kg | (36.0%) | of orthophthalic polyester resin (A7 of Table diluted with styrene in a ratio of 65:35) |
| 4.560 kg | (20.0%) | of isocyanate (TEDIMONT 31) |
| 7.888 kg | (34.6%) | of inert anhydrous silicate powder (PHYLLITE) |
| 0.1596 kg | (0.7%) | of catalyst (cyclohexanone peroxide) |
| 0.0684 kg | (0.3%) | of an accelerator (cobalt nathphenate) |
| 0.775 kg | (3.4%) | of self-extinguishing compound (PHOSGARD) |
| 0.685 kg | (3.0%) | of styrene |
| 22.800 kg | (100%) | |

The components are mixed for 13 seconds, the composition is poured into a die having a cavity of 210×80×5 cm and compressed at a pressure of 100 kg/cm2 for 60 seconds.

The resulting panel has a gross density of 250 kg/m³, a compression strength of 43 kg/cm² and a K-factor of 0.026.

EXAMPLE III

Into a mixer there are contemporaneously introduced from suitable dosage hoppers:

| | | |
|---|---|---|
| 14.720 kg | (36.8%) | of isophthalic polyester resin (A3 of Table diluted with styrene in a ratio of 50:50) |
| 4.800 kg | (12.0%) | of isocyanate (TEDIMONT 31) |
| 12.240 kg | (30.6%) | of inert anhydrous silicate powder (quartz hollow spheres) |
| 0.560 kg | (1.4%) | of catalyst (methyl-ethyl-ketone peroxide) |
| 2.000 kg | (5.0%) | of self-extinguishing compound (PHOSGARD) |
| 1.680 kg | (4.2%) | of styrene |
| 3.520 kg | (8.8%) | of polyol (CARADOL 30) |
| 0.320 kg | (0.8%) | of soybean oil |
| 0.160 kg | (0.4%) | of hydrogen peroxide |
| 40.000 kg | (100%) | |

The components are mixed for 13 seconds, the composition is poured into a die having a cavity of 300×80×5 cm provided with male and female joints and compressed at a pressure of 100 kg/cm² for 60 seconds.

The panel has well shaped joint cavity and protuberance, a gross density of 301 kg/m³, a compression strength of 52 kg/cm² and a K-factor of 0.025.

The possibility of attaining, during the pressing of the panel, a well-shaped joint cavity and protuberance is of fundamental importance for maintaining the same K-factor practically for unlimited time, inasmuch as there are thus avoided heat insulation interruptions in the assembled panels.

EXAMPLE IV

Into a mixer there are contemporaneously introduced from suitable dosage hoppers:

| | | |
|---|---|---|
| 12.664 kg | (34.3%) | of orthophthalic adipic polyester resin (A5 of Table diluted with styrene in a ratio of 60:40) |
| 6.550 kg | (17.8%) | of isocyanate (CARADATE 40) |
| 10.856 kg | (29.5%) | of inert anhydrous silicate powder (glass hollow spheres) |
| 0.552 kg | (1.5%) | of catalyst (methyl-ethyl-ketone peroxide) |
| 0.110 kg | (0.3%) | of accelerator (cobalt octonate) |
| 1.325 kg | (3.6%) | of self-extinguishing compound |
| 1.546 kg | (4.2%) | of styrene |
| 2.908 kg | (7.9%) | of polyol (CARADOL 30) |
| 0.257 kg | (0.7%) | of soybean oil |
| 0.074 kg | (0.2%) | of hydrogen peroxide |
| 36.800 kg | (100%) | |

The components are mixed for 13 seconds, the composition is poured into a die having a cavity of 300×80×5 cm provided with male and female joints and compressed at a pressure of 100 kg/cm² for 60 seconds.

The panel has a gross density of 282 kg/m³, a compression strength of 45 kg/cm² and a K-factor of 0.027.

EXAMPLE V

Into a mixer there are contemporaneously introduced from separate dosage hoppers:

| | | |
|---|---|---|
| 6.440 kg | (46.0%) | of unsaturated polyester resin (A1 of the Table with styrene in a ratio of 65:35) |
| 2.562 kg | (18.3%) | of isocyanate (CARADATE) |
| 2.408 kg | (17.2%) | of polyol (CARDOL) |
| 0.168 kg | (1.2%) | of styrene |
| 0.558 kg | (4.2%) | of self-extinguishing compound (PHOSGARD) |
| 0.084 kg | (0.6%) | of catalyst (methyl-ethyl-ketone peroxide) |
| 0.070 kg | (0.5%) | of hydrogen peroxide |
| 1.680 kg | (12.0%) | of pearlite |
| 14.000 kg | (100%) | |

The components are mixed for 13 seconds, the composition is poured into a die having a cavity of 210×77×3.8 cm and compressed at a pressure of 100 kg/cm² for 60 seconds.

The panel has a gross density of 217 kg/m³ and is particularly well-adapted for the doors.

EXAMPLE VI

Into a mixer there are contemporaneously introduced from separate dosage hoppers:

| | | |
|---|---|---|
| 6.565 kg | (32.50%) | of unsaturated polyester resin (A7 of the Table with styrene in ratio of 65:35) |
| 2.828 kg | (14.00%) | of diisocyanate (TEDIMONT) |
| 2.626 kg | (13.00%) | of polyol (CARADOL) |
| 1.070 kg | (5.30%) | of self-extinguishing compound (PHOSGARD) |
| 0.445 kg | (2.20%) | of catalyst (cyclohexanone-peroxide) |
| 6.666 kg | (33.00%) | of cork and hollow quartz spheres |
| 20.200 kg | (100.00%) | |
| 1.010 kg | (5.00%) | loss of weight |
| 19.190 kg | | |

The components are mixed for 13 seconds and the composition is poured into a die having a cavity of 300×80×4 cm and compressed at a pressure of 100 kg/cm² for 60 seconds.

The panel has a gross density of 200 kg/m³ and is particularly adapted for the movable partition walls.

EXAMPLE VII

Into a mixer there are contemporaneously introduced from separate dosage hoppers:

| | | |
|---|---|---|
| 17.328 kg | (38.0%) | of unsaturated polyester resin (A3 of the Table with styrene in ratio of 50:50) |
| 6.384 kg | (14.0%) | of diisocyanate (TEDIMONT) |
| 1.551 kg | (3.4%) | of self-extinguishing compound (PHOSGARD) |
| 0.547 kg | (1.2%) | of styrene |
| 0.182 kg | (0.4%) | of epoxidic oil |
| 0.456 kg | (1.0%) | of catalyst (methyl-ethyl-ketone peroxide) |
| 0.912 kg | (2.0%) | of hydrogen peroxide |
| 10.944 kg | (24.0%) | of ash |
| 7.296 kg | (16.0%) | of fire clay |
| 45.600 kg | (100%) | |
| 2.280 kg | (5.0%) | loss of weight |
| 43.320 kg | | |

The components are mixed for 13 seconds, the composition is poured into a die having a cavity of 80×300×5 cm and compressed at a pressure of 100 kg/cm² for 60 seconds. The panel has a gross density of 360 kg/m³ and is a particularly well-adapted structural element for the building industry.

EXAMPLE VIII

Into a mixer there are contemporaneously introduced from separate hoppers:

| | | |
|---|---|---|
| 4.437 kg | (34.0%) | of unsaturated polyester resin (A5 of the Table with styrene in ratio of 60:40) |
| 2.570 kg | (24.0%) | of diisocyanate (CARADATE 40) |
| 0.438 kg | (3.5%) | of soybean oil |
| 0.687 kg | (5.5%) | of self-extinguishing compound (PHOSGARD) |
| 0.287 kg | (1.2%) | of styrene |
| 0.150 kg | (1.2%) | of catalyst (methyl-ethyl-ketone peroxide) |
| 2.250 kg | (18.0%) | of cork |
| 1.500 kg | (12.0%) | of ceramic powder |
| 12.500 kg | (100%) | |
| 0.625 kg | (5.0%) | loss of weight |
| 11.875 kg | | |

The components are mixed for 13 seconds, the composition is poured into a die having a cavity of 80×270×3 cm and compressed at a pressure of 100 kg/cm² for 60 seconds. The panel has a gross density of 180 kg/m³ and is adapted for light partition walls.

What I claim is:

1. A composition for the production of stiff expanded self-supporting materials having a low K-factor and high mechanical strength, consisting essentially of:
   A. 28–46 percent by weight of an unsaturated polyester resin containing at least about 25 percent by weight of styrene monomer;
   B. 12–28 percent by weight of an organic diisocyanate;
   C. 12–40 percent by weight of an inert anhydrous filler;
   D. 0.5–2.5 percent by weight of an organic peroxide catalyst;
   E. 4.8–11 percent by weight of a self-extinguishing compound; and
   F. 0–6 percent by weight of styrene.

2. A composition as claimed in claim 1, wherein said unsaturated polyester resin is a linear polyester resin being obtained by polycondensation of at least one diol, with at least two dicarboxylic acids, one of which is unsaturated.

3. A composition as claimed in claim 2, wherein said diol is selected from the group consisting of propylene, dipropylene and diethylene glycols.

4. A composition as claimed in claim 1, wherein said unsaturated polyester resin contains 50 mol percent of saturated and unsaturated acid and 50 mol percent of polyol, said resin being diluted with styrene in a ratio of 50–75 parts by weight of resin to 50–25 parts by weight of styrene.

5. A composition as claimed in claim 2, wherein said dicarboxylic acids include at least one saturated acid selected from phthalic acid anhydride, isophthalic acid and adipic acid and at least one unsaturated acid selected from maleic acid anhydride and fumaric acid.

6. A composition as claimed in claim 1, wherein said diisocyanate is a methylene-diphenyl diisocyanate.

7. A composition as claimed in claim 1, wherein said inert anhydrous filler is selected from the group consisting of alumina silicate, vitreous trachyate, pearlite, fire clay, kaolin and ceramic having a granular size in the range from 100 to 400 microns and having a melting point higher than 1000° C.

8. A composition as claimed in claim 1, wherein said inert anhydrous filler includes at least one member selected from the group consisting of cork and ash.

9. A composition as claimed in claim 1, wherein said inert anhydrous filler consists of a first filler selected from the group consisting of alumina silicate, vitreous trachyte, pearlite, fire clay, kaolin and ceramic and a second filler selected from the group consisting of cork and ash.

10. A composition as claimed in claim 1, wherein said catalyst is selected from a group consisting of benzoyl peroxide, cyclohexanone-peroxide and methyl-ethyl ketone peroxide.

11. A composition as claimed in claim 1, wherein the composition contains an accelerator comprising a cobalt salt.

12. A composition as claimed in claim 11, wherein said cobalt salt is selected from the group consisting of cobalt naphthenate and cobalt octonate.

13. A composition as claimed in claim 1, containing an amine as an accelerator.

14. A composition as claimed in claim 13 wherein said accelerator is dimethyl amine.

15. A composition as claimed in claim 1, containing moreover:
   0 to 2.0 percent of hydrogen peroxide as expansion accelerating agent; and
   0 to 3.5 percent of soybean oil.

16. A composition as claimed in claim 1 wherein said unsaturated polyester resin is produced from the reaction of a diol with about 15 to about 20 percent by weight of an unsaturated acid and about 23 to about 25 percent by weight of a saturated acid.

17. A composition as claimed in claim 1 wherein said unsaturated polyester resin is produced from the reaction of a diol in the amount of about 32 to about 38 percent by weight with about 15 to 20 percent by weight of maleic anhydride and about 23 to about 25 percent by weight of phthalic anhydride.

18. A composition as claimed in claim 1 wherein said unsaturated polyester resin is formed from about an equal number of mols of saturated and unsaturated polycarboxylic acids.

* * * * *